United States Patent
Katsuma

(10) Patent No.: US 6,466,536 B1
(45) Date of Patent: Oct. 15, 2002

(54) OBJECTIVE LENS FOR HIGH-DENSITY OPTICAL RECORDING MEDIUM

(75) Inventor: Toshiaki Katsuma, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/472,006

(22) Filed: Dec. 27, 1999

(30) Foreign Application Priority Data

Jan. 8, 1999 (JP) ............................................. 11-002416

(51) Int. Cl.[7] ................................................. G11B 7/00
(52) U.S. Cl. ................................. 369/112.24; 359/664
(58) Field of Search ....................... 369/112.24, 112.23, 369/44.23; 359/664, 565, 566, 738, 796, 661, 656, 721, 739, 740

(56) References Cited

U.S. PATENT DOCUMENTS

| | | | |
|---|---|---|---|
| 6,058,095 A | * | 5/2000 | Yamamoto et al. .......... 359/365 |
| 6,064,641 A | * | 5/2000 | Braat .......................... 359/664 |
| 6,192,022 B1 | * | 2/2001 | Hendriks et al. ......... 369/112.24 |
| 6,278,560 B1 | * | 8/2001 | Hendriks .................... 359/738 |

OTHER PUBLICATIONS

Patent Abstracts of Japan, Applicant—Sony Corp., Publication No. 10123410 A, Date of publication—May 15, 1998, Application No. 08282750, Date of Filing—Oct. 24, 1996 English Abstract.

* cited by examiner

Primary Examiner—Thang V. Tran
(74) Attorney, Agent, or Firm—Snider & Associates; Ronald R. Snider

(57) ABSTRACT

An objective lens for a high-density optical recording medium, employed as an objective lens for an optical pickup for converging a luminous flux onto an optical recording medium, comprises, successively from the light source side, a first lens $L_1$ made of a biconvex lens having at least one surface formed as an aspheric, and a second lens $L_2$ made of a planoconvex lens having a convex surface directed onto the light source side, and satisfies the following conditional expressions (1) to (3):

$$0.588 < \beta_2 \leq 0.676 \quad (1)$$

$$NA_1 \geq 0.45 \quad (2)$$

$$RMS_1 \leq 0.07\lambda \quad (3)$$

where $\beta_2$ is the imaging magnification of the second lens $L_2$; $NA_1$ is the numerical aperture of the first lens $L_1$; $RMS_1$ is the RMS of the wavefront aberration of the first lens $L_1$; and $\lambda$ is a reference wavelength.

4 Claims, 4 Drawing Sheets

EXAMPLE 1

EXAMPLE 3

EXAMPLE 4

EXAMPLE 5

EXAMPLES 1–4
NA₁ 0.60
WAVEFRONT ABERRATION
(1ST LENS ALONE)

EXAMPLE 5
NA₁ 0.54
WAVEFRONT ABERRATION
(1ST LENS ALONE)

EXAMPLE 1
NA 0.80
-2.0λ  0  2.0λ
WAVEFRONT ABERRATION
(WHOLE SYSTEM)

EXAMPLE 2
NA 0.75
-2.0λ  0  2.0λ
WAVEFRONT ABERRATION
(WHOLE SYSTEM)

EXAMPLE 3
NA 0.90
-2.0λ  0  2.0λ
WAVEFRONT ABERRATION
(WHOLE SYSTEM)

EXAMPLE 4
NA 0.90
-2.0λ  0  2.0λ
WAVEFRONT ABERRATION
(WHOLE SYSTEM)

EXAMPLE 5
NA 0.90
-2.0λ  0  2.0λ
WAVEFRONT ABERRATION
(WHOLE SYSTEM)

OBJECTIVE LENS FOR HIGH-DENSITY OPTICAL RECORDING MEDIUM

RELATED APPLICATIONS

This application claims the priority of Japanese Patent Application No. 11-002416 filed on Jan. 8, 1999, which is incorporated herein by reference.

BACKGROUND OF THE INVENTION

1. Field of the Invention

The present invention relates to an objective lens for a high-density optical recording medium; and, in particular, to an objective lens for a high-density optical recording medium, which is used in an optical pickup apparatus for writing or reading information signals with respect to an optical recording medium such as an optical disk, a magneto-optical disk, an optical card, or the like for which high-density recording is demanded.

2. Description of the Prior Art

In recent years, CD (compact disk), MO (magneto-optical disk), DVD (digital video disk), and the like have come into wider use as an optical recording medium for recording audio information, visual information, data information for computers, and the like.

In optical pickup apparatus for writing or reading information signals with respect to these optical recording media, objective lenses having numerical apertures of 0.45, about 0.5 to 0.6, and 0.6 are in use for CD, MO, and DVD, respectively.

Also, since demands for smaller dimensions, lighter weight, and lower cost are strong, the optical pickup apparatus generally employ an aspherical single-element lens made of a synthetic resin material or glass material as the objective lens for satisfying these demands.

Meanwhile, along with dramatic increases in information recording capacities, there has recently been longing for the emergence of recording media whose density is higher even by a small amount. Therefore, efforts are always under way to improve the recording density of optical recording media.

Here, for improving the recording density of optical recording media, it is necessary to reduce the light-converging spot diameter caused by the objective lens. Letting $\lambda$ be the wavelength of a light source, and NA be the numerical aperture of the objective lens, the light-converging spot diameter is represented by the following expression:

$$k \times \lambda / NA$$

where k is a constant, whereby it is necessary to attain at least one of the shortening of the wavelength of the light source and the increasing of the NA of the objective lens in order to reduce the light-converging spot diameter.

The shortening of the wavelength of the light source has been improved by the shortening of the wavelength of semiconductor lasers and the development of SHG light sources.

On the other hand, the increasing of the NA of the objective lens has conventionally been in progress by employing an aspherical single-element lens. This technique can achieve an NA of about 0.6 or less. For attaining a further higher NA, however, there has been a limit to the use of aspherical single-element lenses, since single-element lenses become harder to make. For example, the objective lens disclosed in Japanese Unexamined Patent Publication No. 10-123410 has a two-group, two element lens configuration in order to attain an NA of about 0.70.

However, the objective lens disclosed in the above-mentioned publication is harder to design and make as compared with the conventional single-element objective lenses, thus increasing labor and cost. Further, since the method of its evaluation is not easy, the labor and cost for inspecting the product would increase.

SUMMARY OF THE INVENTION

In view of the circumstances mentioned above, it is an object of the present invention to provide an objective lens for a high-density optical recording medium, which is easier to design, make, and inspect and can favorably correct aberration, while having a high NA of 0.75 or greater and a two-group, two-element lens configuration.

The objective lens for a high-density optical recording medium in accordance with the present invention is an objective lens for an optical pickup for converging a luminous flux onto an optical recording medium;

the objective lens comprising, successively from a light source side, a first lens made of a biconvex lens having at least one surface formed as an aspheric surface, and a second lens having a convex surface directed onto the light source side, the second lens satisfying the following conditional expression (1):

$$0.588 < \beta_2 \leq 0.676 \tag{1}$$

where $\beta_2$ is the imaging magnification of the second lens.

Preferably, the second lens has a spheric surface on the light source side and a planar surface on the optical recording medium side.

Preferably, the first lens is constituted by a lens whose aberration is corrected by itself and satisfies the following conditional expressions (2) and (3):

$$NA_1 \geq 0.45 \tag{2}$$

$$RMS_1 \leq 0.07\lambda \tag{3}$$

where

NA$_1$ is the numerical aperture of the first lens;

RMS$_1$ is the RIMS of the wavefront aberration of the first lens; and $\lambda$ is a reference wavelength.

Preferably, both surfaces of the first lens may be made aspheric as well.

DESCRIPTION OF THE PREFERRED EMBODIMENTS

In the following, the objective lens for a high-density optical recording medium in accordance with an embodiment of the present invention will be explained with reference to the drawings.

Figure 1:
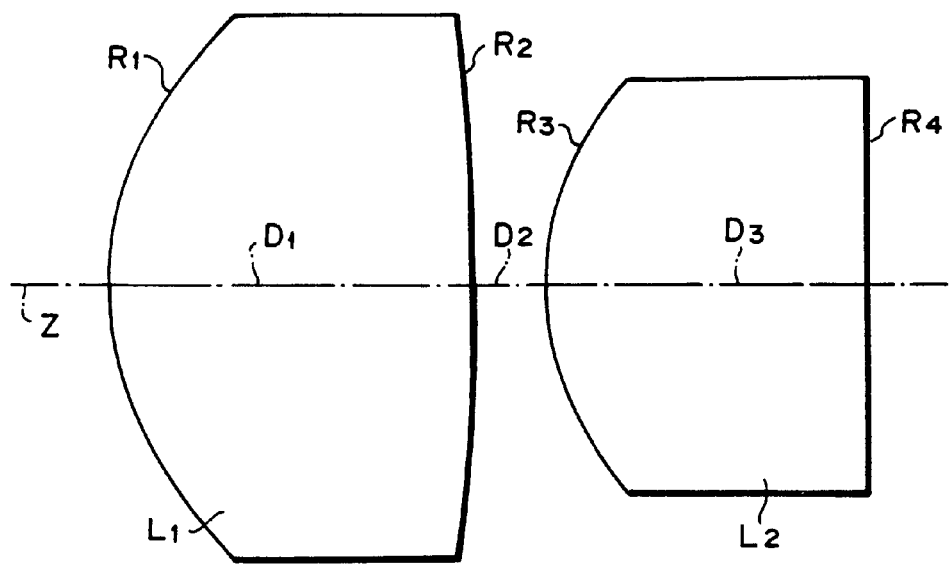
FIG. 1 is a View showing the configuration of the objective lens for a high-density optical recording medium in accordance with Example 1.

FIG. 1 is a view showing the configuration of the objective lens for a high-density optical recording medium in accordance with Example 1 as a representative of this embodiment.

As shown in FIG. 1, the objective lens for a high-density optical recording medium in accordance with this embodiment is a lens having a two-group, two-element configuration comprising, successively from the light source side, a first lens $L_1$ made of a biconvex lens having at least one surface formed as an aspheric surface, and a second lens $L_2$ made of a planoconvex lens. Here, the second lens $L_2$ has a spheric surface with a convex surface directed onto the light source side and a planar surface on the optical recording medium side. The aspherical form of the first lens $L_1$ is represented by the following aspherical depth expression:

$$Z = \frac{Y^2/R}{1+\sqrt{1-K\times Y^2/R^2}} + \sum_{i=2}^{5} A_i Y^{2i}$$

where

Z is the length of the perpendicular to the tangential plane (the plane perpendicular to the optical axis) of an apex of the aspheric surface from a point on the aspheric surface at a distance Y from the optical axis;

Y is the distance from the optical axis;

$A_i$ is the aspheric surface coefficient (i=2 to 5);

K is the eccentricity; and

R is the radius of curvature of the aspheric surface near the optical axis.

Here, light from the light source (not depicted) is transmitted through this objective lens and is focused onto the light-converging point of the second lens $L_2$ on the optical recording medium side. The position of the light-converging point is distanced from the second lens $L_2$ by 1 to 2 μm on the optical axis Z, thus being so close to the second lens $L_2$ that it cannot be depicted.

Also, the objective lens in accordance with this embodiment satisfies the following conditional expressions (1') to (3'):

$$0.588 < \beta_2 \leq 0.676 \quad (1')$$
$$NA_1 \geq 0.45 \quad (2')$$
$$RMS_1 \leq 0.07\lambda \quad (3')$$

where $\beta_2$ is the imaging magnification of the second lens $L_2$;

$NA_1$ is the numerical aperture of the first lens $L_1$;

$RMS_1$ is the root mean square (RMS) of the wavefront aberration of the first lens $L_1$; and $\lambda$ is a reference wavelength.

Operations of this embodiment will now be explained.

First, since at least one surface of the first lens $L_1$ is formed as an aspheric surface, the first lens $L_1$ can become an aberration-corrected lens which is usable as an objective lens by itself.

Also, since the second lens $L_2$ is a planoconvex lens, not only the manufacture in terms of the polishing of the lens or the like becomes easier, but also its centering become s easier, whereby the cost of the lens can be lowered.

Conditional expression (1') defines the imaging magnification $\beta_2$ of the second lens $L_2$ by itself.

If the imaging magnification $\beta_2$ exceeds the upper limit of the expression, then it is necessary to enhance the numerical aperture of the first lens $L_1$ alone in order to enhance the NA of the whole system, whereby it becomes difficult to correct aberration of the first lens $L_1$.

If the imaging magnification $\beta_2$ is below the lower limit of the expression, then it means that the: object point distance becomes longer while the focal length of the second lens $L_2$ is unchanged or that the focal length becomes shorter while the object point distance is unchanged. Here, if the object point distance of the second lens $L_2$ is made longer, it is also necessary to elongate the focal length of the first lens $L_1$, whereby the lens as a whole becomes greater, thus making it difficult to make the lens smaller. If the focal length of the second lens $L_2$ is made shorter, on the other hand, the refracting power of the second lens $L_2$ becomes greater, so that errors in manufacture greatly influence lens performances.

Thus, when the second lens $L_2$ satisfying conditional expression (1') is combined with the first lens $L_1$, whose aberration is corrected by itself as mentioned above, so as to form a lens having a two-group, two-element configuration, a further higher NA of the lens can be attained.

Conditional expression (2') defines the numerical aperture of the first lens $L_1$ when used alone. If the first lens $L_1$ satisfies this conditional expression, then it can easily yield, when combined with the second lens $L_2$, a small-size objective lens with a numerical aperture of 0.75 or greater for a high-density optical recording medium.

Namely, letting $NA_1$ be the numerical aperture of the first lens $L_1$ by itself, and $\beta_2$ be the imaging magnification of the second lens $L_2$, the numerical aperture NA of the whole objective lens is represented by the following expression:

$$NA=NA_1/\beta_2$$

Here, if an objective lens having a numerical aperture of 0.75 or greater for an high-density optical recording medium is to be designed while the numerical aperture of the first lens $L_1$ is set to 0.44 which is below the lower limit of conditional expression (2'), then the imaging magnification of the second lens $L_2$ becomes smaller than 0.588, whereby it becomes difficult to make the objective lens smaller as mentioned above.

Preferably, the first lens $L_1$ has a numerical aperture of about 0.6 at the maximum in view of the fact that its manufacture becomes easier if a lens which has conventionally been made is used.

For example, if an objective lens having a numerical aperture of 0.6 is employed as the first lens $L_1$ of the objective lens in accordance with this embodiment, while the second lens $L_2$ is a lens having an imaging magnification of 0.667, then the whole objective lens system has a numerical aperture of 0.9, whereby a high-NA objective lens for a high-density optical recording medium can be obtained.

Conditional expression (3') is a standard for evaluating wavefront aberration, which is known as Marechal criterion. Lenses satisfying this conditional expression (3') is referred to as aberration-free lenses in general. When this conditional expression (3') is satisfied, then the first lens $L_1$ is configured so as to correct aberration by itself.

Since the first lens $L_1$ is a lens whose aberration are corrected by itself, it will be sufficient if only the aberration correction of the second lens $L_2$ is taken into consideration, whereby the labor for designing and evaluating will be alleviated. Also, even when thee first lens $L_1$ is an aspherical lens whose performances are hard to inspect in general, its performance can be inspected by itself, whereby the process thereof is simplified.

EXAMPLE 1

The objective lens for a high-density optical recording medium in accordance with Example 1 has the configuration, operations, and effects explained in detail in the foregoing, whereas a lens having an aspheric surface on each side thereof is used as the first lens $L_1$.

Table 1(following) shows the radius of curvature (radius of curvature near the optical axis in the case of an aspheric surface) R (mm) of each lens surface, axial surface space of each lens (center thickness of each lens and air space between neighboring lenses) D (mm), and refractive index N of each lens at a wavelength of 410 nm in Example 1. In Table 1 and Tables subsequent thereto, the numbers referring to the radius of curvature R, axial surface space D, and refractive index N successively increase from the light source side.

The middle part of Table 1 lists the respective values of constants of each aspheric surface indicated in the above-mentioned aspherical depth expression in Example 1; whereas the lower part thereof lists the values of incident luminous flux diameter $\phi$ (mm), focal length f (mm) of the whole lens system, numerical aperture NA of the whole lens system, RMS of the wavefront aberration of the whole lens system, focal length $f_1$ (mm) of the first lens $L_1$, numerical aperture $NA_1$ of the first lens $L_1$, $RMS_1$ of the wavefront aberration of the first lens $L_1$, focal length $f_2$ (mm) of the second lens $L_2$, and imaging magnification $\beta_2$ in Example 1.

As shown in Table 1, Example 1 satisfies all of conditional expressions (1') to (3').

EXAMPLE 2

The objective lens for a high-density optical recording medium has a configuration substantially the same as that of Example 1 and exhibits operations and effects similar to those of Example 1, whereas a lens identical to that of Example 1 is used as the first lens $L_1$.

Table 2(following) shows the radius of curvature (radius of curvature near the optical axis in the case of an aspheric surface) R (mm) of each lens surface, axial surface space of each lens (center thickness of each lens and air space between neighboring lenses) D (mm), and refractive index N of each lens at a wavelength of 410 nm in Example 2.

The middle part of Table 2 lists the respective values of constants of each aspheric surface indicated in the above-mentioned aspherical depth expression in Example 2; whereas the lower part thereof lists the values of incident luminous flux diameter $\phi$ (mm), focal length f (mm) of the whole lens system, numerical aperture NA of the whole lens system, RMS of the wavefront aberration of the whole lens system, focal length $f_1$ (mm) of the first lens $L_1$, numerical aperture $NA_1$ of the first lens $L_1$, $RMS_1$ of the wavefront aberration of the first lens $L_1$, focal length $f_2$ (mm) of the second lens $L_2$, and imaging magnification $\beta_2$ in Example 2.

As shown in Table 2, Example 2 satisfies all of conditional expressions (1') to (3').

EXAMPLE 3

Figure 2:
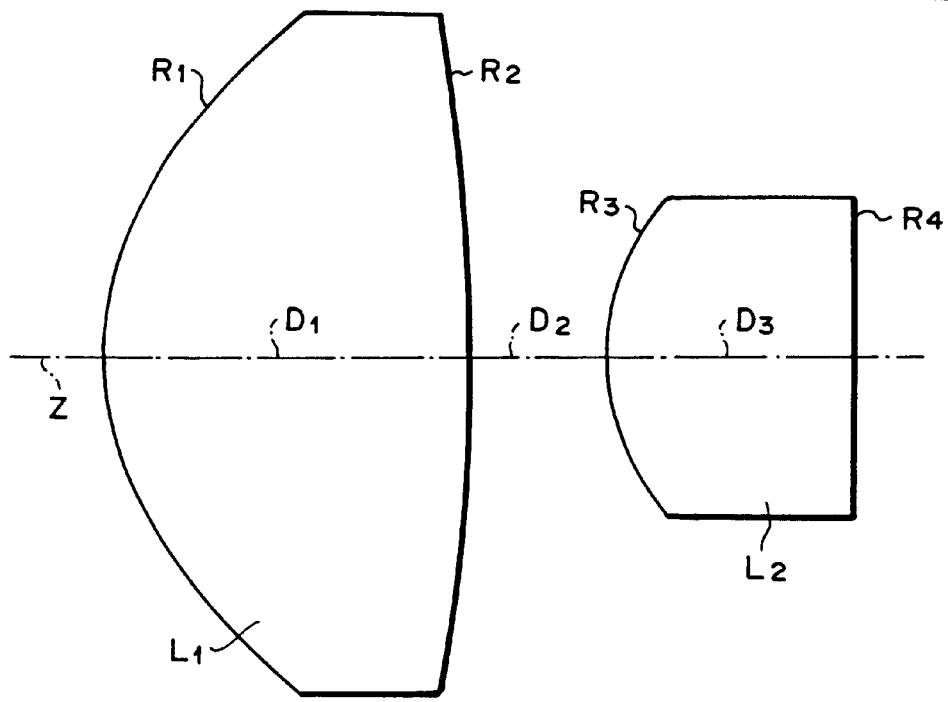
FIG. 2 is a view showing the configuration of the objective lens for a high-density optical recording medium in accordance with Example 3.

FIG. 2 is a view showing the configuration of the objective lens for a high-density optical recording medium in accordance with Example 3.

The objective lens for a high-density optical recording medium has a configuration substantially the same as that of Example 1 and exhibits operations and effects similar to those of Example 1. Here, as the first lens $L_1$, a lens having the same radius of curvature, surface space, and refractive index as those of Example 1 and a diameter greater than that of Example 1 is used.

Table 3(following) shows the radius of curvature (radius of curvature near the optical axis in the case of an aspheric surface) R (mm) of each lens surface, axial surface space of each lens (center thickness of each lens and air space between neighboring lenses) D (mm), and refractive index N of each lens at a wavelength of 410 nm in Example 3.

The middle part of Table 3 lists the respective values of constants of each aspheric surface indicated in the above-mentioned aspherical depth expression in Example 3; whereas the lower part thereof lists the values of incident luminous flux diameter $\phi$ (mm), focal length f (mm) of the whole lens system, numerical aperture NA of the whole lens system, RMS of the wavefront aberration of the whole lens system, focal length $f_1$ (mm) of the first lens $L_1$, numerical aperture $NA_1$ of the first lens $L_1$, $RMS_1$ of the wavefront aberration of the first lens $L_1$, focal length $f_2$ (mm) of the second lens $L_2$, and imaging magnification $\beta_2$ in Example 3.

As shown in Table 3, Example 3 satisfies all of conditional expressions (1') to (3').

EXAMPLE 4

Figure 3:
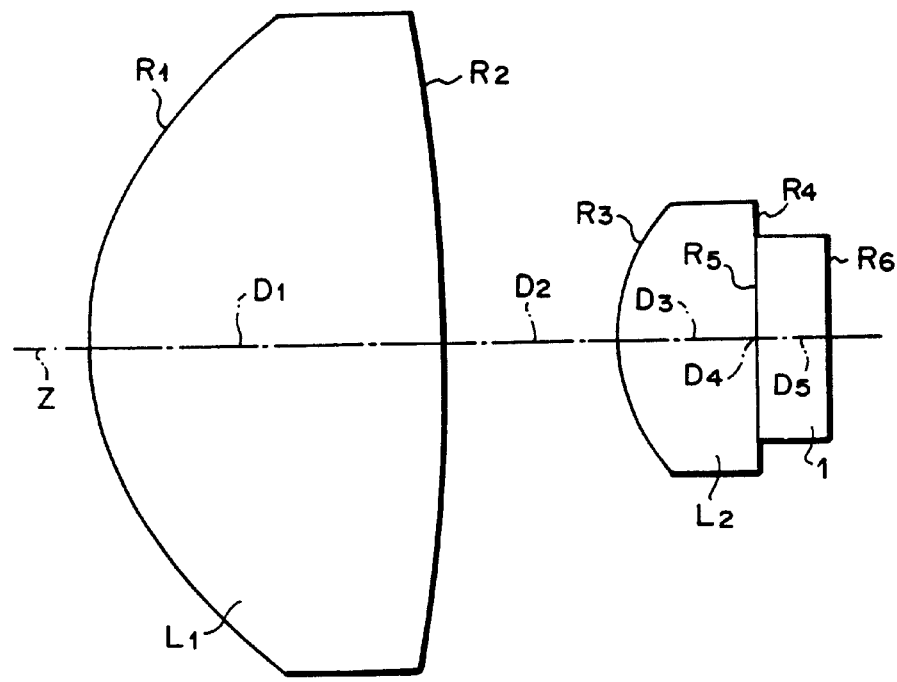
FIG. 3 is a view showing the configuration of the objective lens for a high-density optical recording medium in accordance with Example 4.

FIG. 3 is a view showing the configuration of the objective lens for a high-density optical recording medium in accordance with Example 4.

As shown in FIG. 3, the objective lens in accordance with Example 4 is constituted by two lens elements substantially the same as those of Example 3, whereas cover glass 1 for the optical recording medium is disposed on the optical recording medium side of the second lens $L_2$. Employed as the first lens $L_1$ is a lens identical to that of Example 3, and the whole lens system exhibits operations and effects similar to those of Example 1.

The cover glass 1 can be disposed at a position between the optical-recording-medium-side surface of the second lens $L_2$ and the light-converging point.

The cover glass 1 can have various modes. For example, in the case where the back side of the optical recording medium (the opposite side of the medium from the second lens $L_2$) is formed with a signal surface, the transparent substrate of the optical recording medium can be used as this cover glass 1. For example, in the case where the front side of the optical recording medium (the side facing the second lens $L_2$) is formed with the signal surface, a transparent substrate for adjusting the optical path length disposed at a given position between the second lens $L_2$ and the optical recording medium can be used as the cover glass 1. Further, a transparent substrate for protecting the medium, or the like disposed at a given position between the second lens $L_2$ and the optical recording medium can also be used as this cover glass 1 in the case where the front side of the optical recording medium (the side facing the second lens $L_2$) is formed with the signal surface.

Table 4(following) shows the radius of curvature (radius of curvature near the optical axis in the case of an aspheric surface) R (mm) of each lens surface, axial surface space of each lens (center thickness of each lens and air space between neighboring lenses) D (mm), and refractive index N of each lens at a wavelength of 410 nm in Example 4.

The middle part of Table 4 lists the respective values of constants of each aspheric surface indicated in the above-mentioned aspherical depth expression in Example 4; whereas the lower part thereof lists the values of incident luminous flux diameter $\phi$ (mm), focal length f (mm) of the whole lens system, numerical aperture NA of the whole lens system, RMS of the wavefront aberration of the whole lens system, focal length $f_1$ (mm) of the first lens $L_1$, numerical aperture $NA_1$ of the first lens $L_1$, $RMS_1$ of the wavefront aberration of the first lens $L_1$, focal length $f_2$ (mm) of the second lens $L_2$, and imaging magnification $\beta_2$ in Example 4.

As shown in Table 4, Example 4 satisfies all of conditional expressions (1') to (3').

EXAMPLE 5

Figure 4:
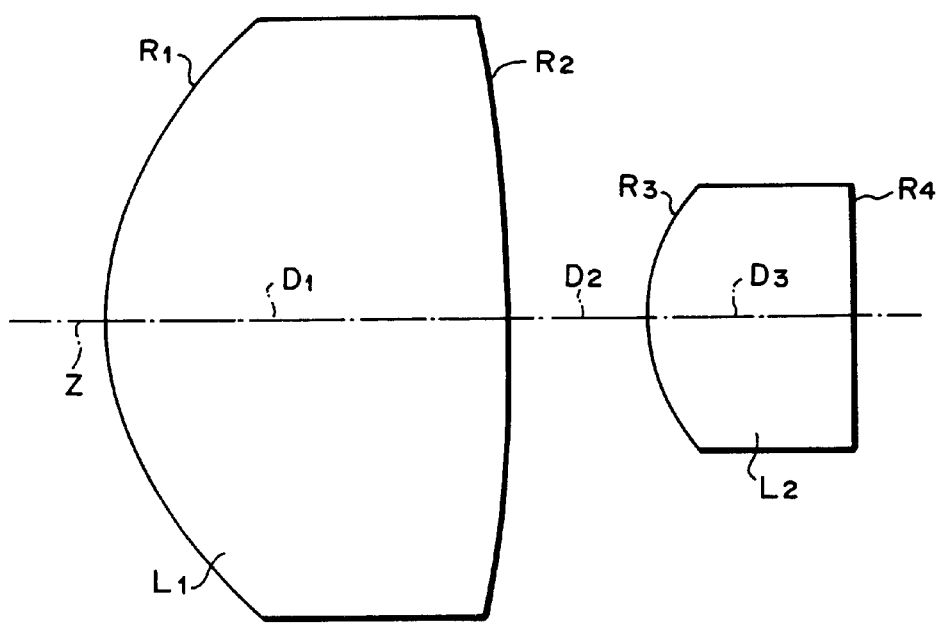
FIG. 4 is a view showing the configuration of the objective lens for a high-density optical recording medium in accordance with Example 5.

FIG. 4 is a view showing the configuration of the objective lens for a high-density optical recording medium in accordance with Example 5.

The objective lens for a high-density optical recording medium in accordance with Example 5 has a configuration substantially the same as that of Example 1 and exhibits operations and effects similar to those of Example 1. Here, in the first lens $L_1$, its surface on the light source side is aspheric, whereas its surface on the optical recording medium side is spheric.

Table 5(following) shows the radius of curvature (radius of curvature near the optical axis in the case of an aspheric surface) R (mm) of each lens surface, axial surface space of each lens (center thickness of each lens and air space between neighboring lenses) D (mm), and refractive index N of each lens at a wavelength of 410 nm in Example 5.

The middle part of Table 5 lists the respective values of constants of the aspheric surface indicated in the above-mentioned aspherical depth expression in Example 5; whereas the lower part thereof lists the values of incident luminous flux diameter $\phi$ (mm), focal length f (mm) of the whole lens system, numerical aperture NA of the whole lens system, RMS of the wavefront aberration of the whole lens system, focal length $f_1$ (mm) of the first lens $L_1$, $NA_1$ is the numerical aperture of the first lens, RMS of the wavefront aberration of the whole lens system, focal length $f_1$ (mm) of the first lens $L_1$, numerical aperture $NA_1$ of the first lens $L_1$, $RMS_1$ of the wavefront aberration of the first lens $L_1$, focal length $f_2$ (mm) of the second lens $L_2$, and imaging magnification $\beta_2$ in Example 5.

As shown in Table 5, Example 5 satisfies all of conditional expressions (1') to (3').

Figure 5A:
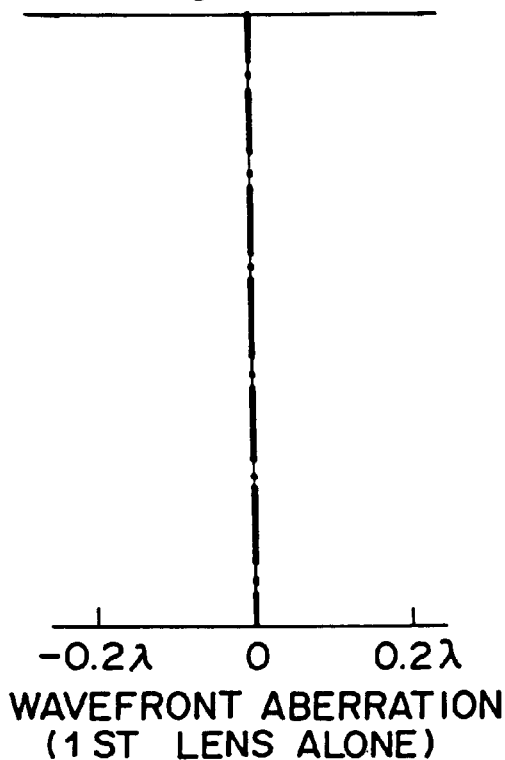
FIG. 5A is a wavefront aberration chart of the first lens at a wavelength of 410 nm in Examples 1 to 4.
Figure 5B:
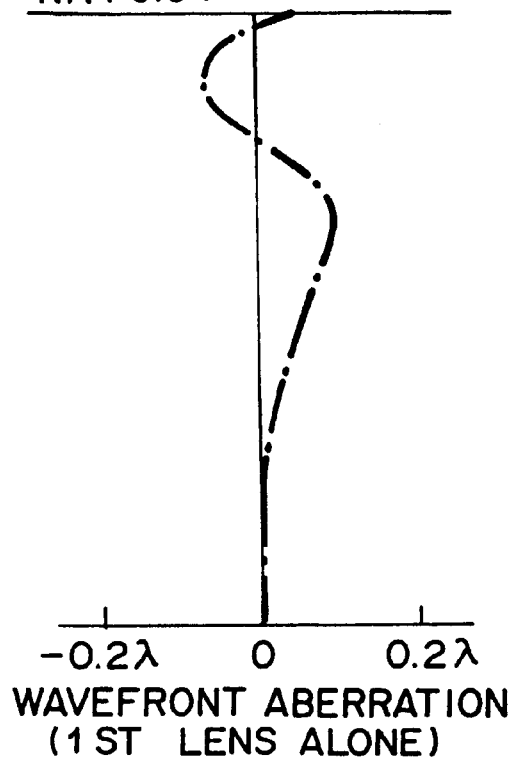
FIG. 5B is a wavefront aberration chart of the first lens at a wavelength of 410 nm in Example 5.
Figure 6A:
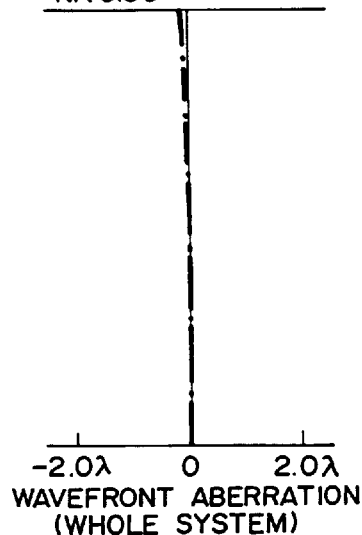
FIGS. 6A to 6E are wavefront aberration charts of the whole lens system at a wavelength of 410 nm in Examples 1 to 5, respectively.
Figure 6B:
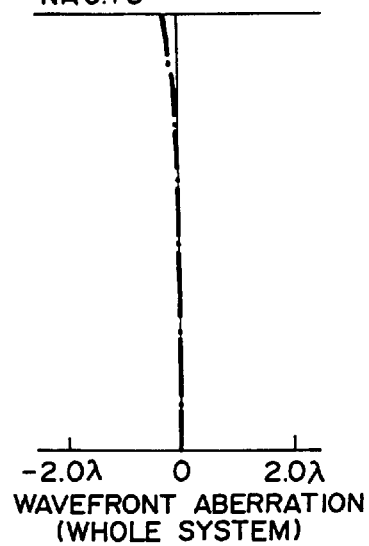
Figure 6C:
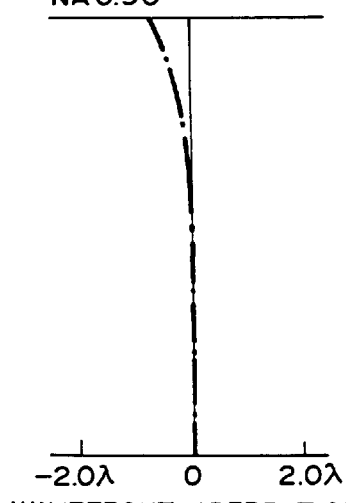
Figure 6D:
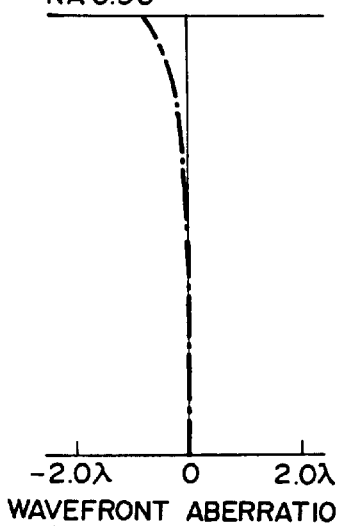
Figure 6E:
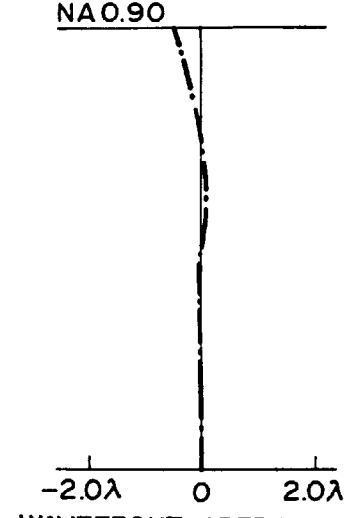

FIGS. 5A and 5B are charts showing wavefront aberration of the first lens $L_1$ at a wavelength of 410 nm in Examples 1 to 4 and in Example 5, respectively. As can be seen from FIGS. 5A and 5B, the first lens $L_1$ in each of Examples 1 to 5 is a lens whose aberration are favorably corrected by itself.

FIGS. 6A to 6E are wavefront aberration charts of the whole lens system at a wavelength of 410 nm in Examples 1 to 5, respectively. As can be seen from FIGS. 6A to 6E, the objective lens in accordance with each of Examples 1 to 5 is a lens whose aberration are favorably corrected.

Without being restricted to those of the above-mentioned Examples, the objective lens of the present invention can be modified in various manners. For example, the radius of curvature R of each lens and the lens space (or lens thickness) D can be changed as appropriate.

Though the optical-recording-medium-side surface of the second lens $L_2$ is preferably a planar surface in general from the viewpoint of processability, it may be a surface having a slight curvature as well.

Also, the objective lens in accordance with the present invention is not only applicable to cases where the object point (light source) is at infinity, but also usable as a so-called finite conjugate type lens whose objective point is disposed at a finite distance.

As explained in the foregoing, the objective lens for a high-density optical recording medium in accordance with the present invention has a two-group, two-element configuration in which an aspherical lens conventionally known as a single-element objective lens for an optical pickup is used as the first lens, whereas a lens with a predetermined imaging magnification having a convex surface directed onto the light source side is used as the second lens, whereby a high-NA objective lens can be attained while making its aberration better without increasing the labor and cost for designing, making, and inspecting the lens.

TABLE 1

Example 1

| Surface | Radius of curvature (R) | Surface space (D) | Refractive index(N) ($\lambda$ = 410 nm) |
|---|---|---|---|
| 1 (aspheric) | 0.50392 | 0.501 | 1.52749 |
| 2 (aspheric) | -2.26070 | 0.102 | 1.00000 |
| 3 (spheric) | 0.45000 | 0.445 | 1.68981 |
| 4 (planer) | $\infty$ | | |

Aspherical coefficients ($1^{st}$ surface)

| | | | |
|---|---|---|---|
| $A_2$ | = 4.135175045 × $10^{-1}$ | $A_3$ | = 1.914741817 × $10^{-1}$ |
| $A_4$ | = 1.013731401 | $A_5$ | = -1.029224533 × 10 |
| K | = 1.000000000 × 10-1 | | |

($2^{nd}$ surface)

| | | | |
|---|---|---|---|
| $A_2$ | = 1.114911485 | $A_3$ | = -6.651195486 |
| $A_4$ | = 1.754789159 × 10 | $A_5$ | = -2.025077182 × 10 |
| K | = 2.000000000 × $10^{-1}$ | | |
| $\phi$ = 0.792 | f = 0.49530 | NA = 0.80 | RMS = 0.02$\lambda$ |
| $f_1$ = 0.83333 | $NA_1$ = 0.48 | $RMS_1$ = 0.00$\lambda$ | |
| $f_2$ = 0.65235 | $\beta_2$ = 0.59436 | | |

TABLE 2

Example 2

| Surface | Radius of curvature (R) | Surface space (D) | Refractive index(N) ($\lambda$ = 410 nm) |
|---|---|---|---|
| 1 (aspheric) | 0.50392 | 0.501 | 1.52749 |
| 2 (aspheric) | -2.26070 | 0.147 | 1.00000 |
| 3 (spheric) | 0.40000 | 0.396 | 1.60381 |
| 4 (planar) | $\infty$ | | |

Aspherical coefficients ($1^{st}$ surface)

| | | | |
|---|---|---|---|
| $A_2$ | = 4.135175045 × $10^{-1}$ | $A_3$ | = 1.914741817 × $10^{-1}$ |
| $A_4$ | = 1.013731401 | $A_5$ | = -1.029224533 × 10 |
| K | = 1.000000000 × 10-1 | | |

($2^{nd}$

TABLE 2-continued

Example 2 surface)

| | | | | |
|---|---|---|---|---|
| $A_2$ | = 1.114911485 | $A_3$ | = | -6.651195486 |
| $A_4$ | = 1.754789159 × 10 | $A_5$ | = | -2.025077182 × 10 |
| K | = 2.000000000 × $10^{-1}$ | | | |

$\phi = 0.780$  f = 0.51949  NA = 0.75  RMS = 0.02λ
$f_1 = 0.83333$  $NA_1 = 0.47$  $RMS_1 = 0.00λ$
$f_2 = 0.66246$  $\beta_2 = 0.62338$

TABLE 3

Example 3

| Surface | Radius of curvature (R) | Surface space (D) | Refractive index(N) (λ = 410 nm) |
|---|---|---|---|
| 1 (aspheric) | 0.50392 | 0.501 | 1.52749 |
| 2 (aspheric) | -2.26070 | 0.197 | 1.00000 |
| 3 (spheric) | 0.35000 | 0.346 | 1.52749 |
| 4 (planer) | ∞ | | |

Aspherical coefficients ($1^{st}$ surface)

| | | | | |
|---|---|---|---|---|
| $A_2$ | = 4.135175045 × $10^{-1}$ | $A_3$ | = | 1.914741817 × $10^{-1}$ |
| $A_4$ | = 1.013731401 | $A_5$ | = | -1.029224533 × 10 |
| K | = 1.000000000 × 10-1 | | | |

($2^{nd}$ surface)

| | | | | |
|---|---|---|---|---|
| $A_2$ | = 1.114911485 | $A_3$ | = | -6.651195486 |
| $A_4$ | = 1.754789159 × 10 | $A_5$ | = | -2.025077182 × 10 |
| K | = 2.000000000 × $10^{-1}$ | | | |

$\phi = 0.982$  f = 0.54544  NA = 0.90  RMS = 0.06λ
$f_1 = 0.83333$  $NA_1 = 0.59$  $RMS_1 = 0.00λ$
$f_2 = 0.66352$  $\beta_2 = 0.65452$

TABLE 4

Example 4

| Surface | Radius of curvature (R) | Surface space (D) | Refractive index(N) (λ = 410 nm) |
|---|---|---|---|
| 1 (aspheric) | 0.50392 | 0.501 | 1.52749 |
| 2 (aspheric) | -2.26070 | 0.247 | 1.00000 |
| 3 (spheric) | 0.30000 | 0.196 | 1.52749 |
| 4 (planar) | ∞ | 0.000 | 1.00000 |
| 5 (cover glass) | ∞ | 0.100 | 1.53000 |
| 6 (cover glass) | ∞ | | |

Aspherical coefficients ($1^{st}$ surface)

| | | | | |
|---|---|---|---|---|
| $A_2$ | = 4.135175045 × $10^{-1}$ | $A_3$ | = | 1.914741817 × $10^{-1}$ |
| $A_4$ | = 1.013731401 | $A_5$ | = | -1.029224533 × 10 |
| K | = 1.000000000 × 10-1 | | | |

($2^{nd}$ surface)

| | | | | |
|---|---|---|---|---|
| $A_2$ | = 1.114911485 | $A_3$ | = | -6.651195486 |
| $A_4$ | = 1.754789159 × 10 | $A_5$ | = | -2.025077182 × 10 |
| K | = 2.000000000 × $10^{-1}$ | | | |

$\phi = 0.982$  f = 0.54542  NA = 0.90  RMS = 0.06λ
$f_1 = 0.83333$  $NA_1 = 0.59$  $RMS_1 = 0.00λ$
$f_2 = 0.56873$  $\beta_2 = 0.65450$

TABLE 5

Example 5

| Surface | Radius of curvature (R) | Surface space (D) | Refractive index(N) (λ = 410 nm) |
|---|---|---|---|
| 1 (aspheric) | 0.48792 | 0.580 | 1.52749 |
| 2 (spheric) | -2.61523 | 0.196 | 1.00000 |
| 3 (spheric) | 0.30000 | 0.295 | 1.68981 |
| 4 (planar) | ∞ | | |

Aspherical coefficients ($1^{st}$ surface)

| | | | | |
|---|---|---|---|---|
| $A_2$ | = 2.974350621 × $10^{-1}$ | $A_3$ | = | 1.890349216 × $10^{-1}$ |
| $A_4$ | = 1.013725312 | $A_5$ | = | -1.029224534 × 10 |
| K | = 7.274872752 × $10^{-2}$ | | | |

$\phi = 0.893$  f = 0.49636  NA = 0.90  RMS = 0.07λ
$f_1 = 0.83333$  $NA_1 = 0.54$  $RMS_1 = 0.04λ$
$f_2 = 0.43490$  $\beta_2 = 0.59563$

What is claimed is:

1. An objective lens for a high-density optical recording medium, employed as an objective lens for an optical pickup for converging a luminous flux onto an optical recording medium;

said objective lens comprising successively from a light source side, a first lens made of a biconvex lens having at least one surface formed as an aspheric surface, and a second lens having a convex surface directed onto the light source side, said second lens satisfying the following conditional expression (1):

$$0.588 < \beta_2 \leq 0.676 \quad (1)$$

where $\beta_2$ is the imaging magnification of the second lens, and wherein said first lens is constituted by a lens whose aberration is corrected by itself and satisfies the following conditional expressions (2) and (3):

$$NA_1 \geq 0.45 \quad (2)$$

$$RMS_1 \leq 0.07\lambda \quad (3)$$

where $NA_1$ is the numerical aperture of the first lens;

$RMS_1$ is the root mean square of the wavefront aberration of the first lens; and λ is a reference wavelength.

2. An objective lens for a high-density optical recording medium according to claim 1, wherein said second lens has a spheric surface on the light source side and a planar surface on the optical recording medium side.

3. An objective lens for a high-density optical recording medium according to claim 2, wherein both surfaces of said first lens are made aspheric.

4. An objective lens for a high-density optical recording medium according to claim 1, wherein both surfaces of said first lens are made aspheric.

* * * * *